United States Patent [19]
Alewelt et al.

[11] Patent Number: 5,384,389
[45] Date of Patent: Jan. 24, 1995

[54] PROCESS FOR THE PRODUCTION OF POLYCARBONATES

[75] Inventors: Wolfgang Alewelt; Hermann Kauth; Steffen Kühling, all of Krefeld, Germany

[73] Assignee: Bayer Aktiengesellschaft, Leverkusen, Germany

[21] Appl. No.: 155,393

[22] Filed: Nov. 19, 1993

[30] Foreign Application Priority Data

Dec. 3, 1992 [DE] Germany ............... 4240588

[51] Int. Cl.$^6$ ............................... C08G 79/02
[52] U.S. Cl. .................... 528/168; 526/64; 528/196; 528/198; 528/204; 528/483; 528/484
[58] Field of Search ............... 528/483, 484, 196, 168, 528/198, 204; 526/64

[56] References Cited

U.S. PATENT DOCUMENTS

| | | | |
|---|---|---|---|
| 2,964,797 | 12/1960 | Pellstöcker et al. | 18/57 |
| 3,153,008 | 10/1964 | Fox | 528/196 |
| 3,282,893 | 11/1966 | Shechter | 528/196 |
| 4,330,664 | 5/1982 | Brunelle | 528/198 |
| 4,948,871 | 8/1990 | Kuknoka et al. | 528/481 |
| 5,026,817 | 6/1991 | Sakashita et al. | 528/199 |
| 5,097,002 | 3/1992 | Sakashita et al. | 528/199 |
| 5,104,963 | 4/1992 | Westeppe et al. | 528/196 |
| 5,142,018 | 8/1992 | Sakashita et al. | 528/199 |
| 5,151,491 | 9/1992 | Sakashita et al. | 528/199 |
| 5,179,181 | 1/1993 | Honma et al. | 526/216 |

FOREIGN PATENT DOCUMENTS

| | | |
|---|---|---|
| 1031512 | 11/1958 | Germany . |
| 4038967 | 6/1991 | Germany . |
| 2153925 | 6/1990 | Japan . |
| 2153926 | 6/1990 | Japan . |
| 2153927 | 6/1990 | Japan . |

OTHER PUBLICATIONS

DE 4038967 "Two Stage Prodn. of Aromatic Polycarbonate . . . " Tacke et al.; (1991); Abstract.
Chemistry and Physics of Polycarbonates, Polymer Reviews, H. Schnell, vol. 9, John Wiley and Sons Inc. (1964) pp. 41–51.

Primary Examiner—John Kight, III
Assistant Examiner—Terressa M. Mosley
Attorney, Agent, or Firm—Joseph C. Gil; Aron Preis

[57] ABSTRACT

A process for the production of polycarbonates is disclosed. Accordingly, oligocarbonate in the melt is passed through a heated tube and inert gas is simultaneously introduced by injecting to the melt.

6 Claims, No Drawings

PROCESS FOR THE PRODUCTION OF POLYCARBONATES

FIELD OF THE INVENTION

The invention relates to a process for the production of polycarbonates, and especially to the melt polycondensation of oligocarbonates in the presence of an inert gas.

SUMMARY OF THE INVENTION

A process for producing an aromatic polycarbonate resin by polycondensing oligocarbonate melt is disclosed. In accordance with the process the oligocarbonate melt is passed through a heated tube and a quantity of inert gas is simultaneously introduced into the tube. The polycondensing is carried out at temperatures of 200° C. to 400° C. and the oligocarbonates have a weight average molecular weight a of 2000 to 20000. The quantity of inert gas is at least 1 m$^3$ of said gas per kg of oligocarbonate melt and the heated tube has a length/diameter ratio of 10/1 to 200/1. The process is further characterized in that the ratio of polycarbonate throughput (in kg/h) to the volume of the tube (in liters) is about 20/1 to 2/1.

DESCRIPTION OF THE PRIOR ART

The production of aromatic oligo/polycarbonates using the melt transesterification process is known in the literature and is described, for example, in Encyclopedia of Polymer Science, Vol. 10 (1969), Chemistry and Physics of Polycarbonates, Polymer Reviews, H. Schnell, Vol. 9, John Wiley and Sons Inc. (1964), European Patent Applications 338,085, 360,578, 351,168, Japanese Patents JP 36-694, 36-13 942, U.S. Pat. Nos. 4,330,664, 5,026,817 and in DP 1,031,512.

In the above-mentioned references and the references cited therein, the monomeric starting materials are combined with a catalyst and the monophenol liberated in the reaction is distilled off at elevated temperature. The process is performed either at normal pressure or under reduced pressure, small quantities of an inert gas are optionally passed over to provide an inert blanket. According to U.S. Pat. Nos. 2,964,797 and 3,153,008, melt transesterification is advantageously performed under reduced pressure using inert gas in order to avoid undesired oxidative secondary reactions (U.S. Pat. No. 3,153,008, column 3, lines 53 to 63 and U.S. Pat. No. 2,964,797, column 4, lines 35 to 38). Since, in both cases, the inert gas acts only to provide an inert blanket, it is used, as described in the examples, only in small quantities. As the condensation proceeds, the temperature is successively raised and the pressure reduced to a high vacuum and monophenol is further distilled off.

Many of the processes which have to date become known have the disadvantage that, in order to achieve the desired conversion or degree of polymerization, towards the end of the reaction monophenol and optionally residual monomers must be removed from a viscous melt. Therefore, in order to remove these residual monomers, a high vacuum is used in combination with special equipment. To this end, there are described stirred-tank reactors or series of stirred-tank reactors (JP 308,390), film evaporators (JP 308,391), stirred-tank reactors combined with a heat exchanger (JP 308,392), horizontal polycondensation reactors with special stirrer geometries (JP 308,393), disk reactors and screw machines. These techniques are costly, because the equipment must be self-cleaning to prevent product fouling and because the plants must be high vacuum tight to avoid discoloration. Moreover, long dwell times are required for the condensation, which damages the product.

It is described in U.S. Pat. No. 3,282,893 that there are disadvantages in using inert gases in the production of polycarbonates according to the melt transesterification process in order to remove diaryl carbonates and/or phenols. Steam combined with a vacuum is therefore used according to the teaching of U.S. Pat. No. 3,282,93.

The assessment that inert gases are unsatisfactory for melt polycondensation is overcome by the present invention. It has now been found that an oligocarbonate melt may be condensed in a tube by injecting an inert gas, for instance nitrogen, without the simultaneous application of a vacuum.

EP 0,432,580 provides a two-stage polycarbonate production process, wherein in a first stage oligomeric polycarbonates with molecular weights $M_w$ of <10500 and phenolic OH groups <500 ppm are produced using any desired process and the second stage proceeds either in a melt or by solid phase post-condensation. Condensation may be performed in customary reaction vessels such as tanks, tubes and the like. If condensation is performed in a melt, the pressure may be 0.1 to 2 bar. In the examples, however, the second stage is performed only in the solid phase. In contrast, it was not obvious to perform melt condensation in a thin tube, as tanks or special reactors are customarily used for this purpose.

Tubes are known for small scale solid phase condensation reactions in which cristallised powders are condensed at temperatures below the cristalline melting point; on the large scale, these tubes correspond to condensation towers, because condensation times are very lengthy.

A two-stage process for the production of aromatic polycarbonates is known from DE-OS 4,038,967, wherein in the first stage oligocarbonates are produced according to the known phase interface process, which oligocarbonates are polycondensed in the second stage in the solid phase or as a melt. Post-condensation in a melt may proceed, for example, in an extruder, kneader or similar units, preferably under a vacuum (column 3, lines 15 to 18). While solid phase post-condensation of the cristalline oligomer is indeed performed in a tube in a stream of $N_2$ under normal pressure at temperatures between 180° C. and 230° C. (column 4, lines 32 to 37), it was not obvious that condensation in the melt is achieved in a relatively short time.

It has now surprisingly been found that an amorphous oligocarbonate produced in a manner known per se, may be condensed in a melt within short period ($\leq$ few minutes) into higher molecular weight polycarbonate and namely by passing the oligocarbonate through a heated tube at normal or elevated pressure and simultaneously introducing an inert gas into the tube-system.

The polycarbonate melt and inert gas with the volatile residual monomers are separated, for example in a cyclone, and the monomers condensed in a condenser.

DETAILED DESCRIPTION OF THE INVENTION

The present invention provides a process for the production of aromatic polycarbonates at temperatures from 200° C. to 400° C., preferably from 220° C. to 350° C., especially preferred from 250° C. to 350° C., optionally in the presence of catalysts by melt transesterification of aromatic oligocarbonates having a weight average molecular weight (Mw—determined by relative solution viscosity in $CH_2Cl_2$ at 20° C. and a concentration of 0.5 g per 100 ml of $CH_2Cl_2$) of 2000 to 20000, preferably from 3000 to 10000, which process is characterized in that the oligocarbonate is polycondensed in one or more stages, at least one of which is arranged such that the oligocarbonate melt passes through a heated tube into which an inert gas is simultaneously introduced in a quantity of at least 1 $m^3$/kg of oligocarbonate melt, preferably of >2 $m^3$/kg of oligocarbonate melt, wherein the heated tube has a length/diameter ratio of 10/1 to 200/1 and wherein the ratio of polycarbonate throughput (in kg/h) to tube volume (in liters) is between 20/1 and 2/1.

Oligocarbonates used pursuant to the process according to the invention are produced in a known manner by reacting diphenols with carbonic acid diaryl esters, optionally in the presence of catalysts. The following bisphenols are, for example, suitable for this purpose: hydroquinone, resorcinol, dihydroxydiphenyls, bis-(hydroxyphenyl)alkanes, bis-(hydroxyphenyl)cycloalkanes, bis-(hydroxyphenyl)sulphides, bis-(hydroxyphenyl)ethers, bis-(hydroxyphenyl)ketones, bis-(hydroxyphenyl)sulphones, bis-(hydroxyphenyl)sulphoxides, $\alpha,\alpha'$-bis-(hydroxyphenyl)diisopropylbenzenes and their ring-alkylated and ring-halogenated derivatives.

Diphenyl carbonate is preferred as the carbonic acid diaryl ester.

The catalysts to be used for the process according to the invention are known alkali metal, alkali-earth metal and transitional metal hydroxides, elkoxides, phenolates, carbonates, acetates, borates, hydrogen phosphates, hydrides and ammonium or phosphonium salts, such as for example tetramethylammonium hydroxide, tetramethylammonium tetraphenylborate and tetraphenyl-phosphonium tetraphenylborate.

The tube to be used is heated to 200° C. to 400° C., preferably to 220° C. to 350° C. especially preferred to 250° C. to 350° C. The tube is preferably of round cross-section and may be longitudinally extended or bent in any desired shape, for example into a spiral. The length/diameter ratio of the tube is 10/1 to 200/1, preferably 25/1 to 100/1. The ratio of polycarbonate throughput (in kg/h) through the tube to tube volume (in l) is 20/1 to 2/1, preferably 15/1 to 4/1. In this context the dwell time, necessary, is less than 20 minutes, preferably less than 10 minutes.

Suitable inert gases are, for example, the noble gases, nitrogen or $CO_2$, nitrogen is preferred. The inert gas is mixed with the oligocarbonate melt in a T-piece or jet and then passes with the oligocarbonate into the above-mentioned tube. The quantity of inert gas is at least 1 $m^3$ per kg of oligocarbonate. The upper limit for inert gas usage is determined for the person skilled in the art by economic viability.

The increase in molecular weight which may be achieved with the process according to the invention is dependent on oligocarbonate throughput, on the oligocarbonate/inert gas ratio and on the dwell time resulting from the dimensions of the tube and the stated parameters.

As already mentioned, after leaving the tube, the polycarbonate is separated, for example in a cyclone, from the inert gas and liberated monomers and the volatile monomers are condensed.

Depending on the molecular weight achieved, the polycarbonate may either be isolated and pelletized, or be adjusted to the desired final molecular weight in a subsequent condensation stage in a known manner or preferably using the described process.

The aromatic polycarbonates obtainable in accordance with the process according to the invention preferably have average molecular weights MW (weight average molecular weights, determined by measuring relative solution viscosity in $CH_2Cl_2$ at 25° C. and a concentration of 0.5 g per 100 ml of $CH_2Cl_2$) of 10000 to 100000, in particular from 15000 to 60000.

The polycarbonates may be processed into any desired moldings using customary machinery, for example in extruders or injection molding machines, for example into sheet or film.

Customary additives, for example stabilizers, mold release agents or flame retardants, may be incorporated into the polycarbonates according to the invention before or during processing.

The polycarbonates obtainable according to the invention or their moldings may be used in the industrial sectors known for polycarbonates, for example in the lighting sector, in the electrical industry, in the construction sector and in optical applications.

The invention is further illustrated but is not intended to be limited by the following examples in which all parts and percentages are by weight unless otherwise specified.

EXAMPLES

Example 1

5130 g (22.5 mol) of bisphenol A, 5152 g (24.08 mol) of diphenyl carbonate and 29 mg of sodium phenolate are weighed out into a stirred vessel. The vessel is provided with an inert gas blanket and the raw materials heated to 180° C. A vacuum of 300 mbar is then applied and the material temperature maintained at 180° C. for 30 minutes and the liberated phenol distilled off through a column. Within a further 30 minutes the temperature is raised to 225° C. and the vacuum is then raised stepwise over 90 minutes to 10 mbar. Then, at 30 mbar, the material temperature is raised over 60 minutes to 280° C. and a sample of the precondensate drawn off.

At this point, the precondensate has a relative solution viscosity—measured as a solution of 0.5 g of PC in 100 ml of solution (the solvent is methylene chloride)—of 1.086 and a molecular weight 5500. Nitrogen is then introduced into the stirred vessel and the oligocarbonate is passed at a rate of 3 kg/h through a spiral-wound tube heated to 300° C. The tube has an internal diameter of 10 mm and is 3 m long. 8 $m^3$/h of nitrogen at 4 bar—also heated to 300° C.—are passed through the tube together with the pre-condensate. After leaving the tube, the produced polycarbonate is separated from the inert gas and liberated volatile monomers in a separator. It has a relative viscosity of 1.13.

Example 2

The precondensate is produced in the stirred vessel as in Example 1. Throughput through the spiral is, however, 1.5 kg/h, the quantity of nitrogen 8 m$^3$/h. The relative viscosity is 1.16.

Example 3

The precondensate is produced in the stirred vessel as in Example 1. Throughput through the spiral is, however, 0.5 kg/h and the quantity of nitrogen was reduced to 6.5 m$^3$/h. The relative viscosity is 1.21.

Example 4

5130 g (22.5 mol) of bisphenol A, 5152 g (24.08 mol) of diphenyl carbonate and 29 mg of sodium phenolate are weighed out into a stirred vessel. The vessel is provided with an inert gas blanket and the raw materials heated to 180° C. A vacuum of 300 mbar is then applied and the material temperature maintained at 180° C. for 30 minutes and the liberated phenol distilled off through a column. Within a further 30 minutes the temperature is raised to 225° C. and the vacuum is then raised stepwise over 90 minutes to 100 mbar. Then, at 100 mbar, the material temperature is raised over 60 minutes to 280° C. and a sample of the precondensate drawn off.

At this point, the precondensate has a relative solution viscosity—measured as a solution of 0.5 g of PC in 100 ml of solution (the solvent is methylene chloride)—of 1,055 and a molecular weight Mw=3000. Nitrogen is then introduced into the stirred vessel and the precondensate passed at a rate of 3 kg/h together with 8 m$^3$/h of nitrogen at 4 bar through the spiral together with the pre-condensate a described in example 1. After leaving the tube, the condensed/product has a relative viscosity of 1.097.

Example 5

The precondensate is produced in the stirred vessel as in Example 4. Throughput through the spiral is, however, 2.0 kg/h and the quantity of nitrogen 8 m$^3$/h. The relative viscosity is 1,120.

Example 6

The precondensate is produced in the stirred vessel as in Example 4. Throughput through the spiral is, however, 1.4 kg/h and the quantity of nitrogen 8 m$^3$/h. The relative viscosity is 1.142.

Example 7

The product from Example 1 is melted and passed a second time through the spiral described in Example 1 at a rate of 2.5 kg/h together with 8 m$^3$/h of nitrogen at 4 bar. The relative viscosity is 1.17.

Example 8

Example 7 is repeated with a throughput of 1.5 kg/h of product and 8 m$^3$/h. The relative viscosity is 1.23.

Example 9

Example 7 is repeated with a throughput of 0.65 kg/h of product and 8 m$^3$/h. The relative viscosity is 1.27.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the process for producing an aromatic polycarbonate resin by polycondensing oligocarbonate melt the improvement comprising passing said oligocarbonate melt through a heated tube dwell time under 20 minutes and simultaneously introducing into said tube a quantity of inert gas, said polycondensing being carried out at temperatures of 200° C. to 400° C., said oligocarbonates having a weight average molecular weight a of 2000 to 20000, said quantity being at least 1 m$^3$ of said gas per kg of oligocarbonate melt, said heated tube having a length/diameter ratio of 10/1 to 200/1, said process being further characterized in that the ratio of polycarbonate throughput (in kg/h) to tube volume (in liters) is about 20/1 to 2/1.

2. The process of claim 1 wherein said process is carried out at temperatures of 220° C. to 350° C.

3. The process of claim 1 wherein said oligocarbonates have a weight average molecular weight a of 3000 to 10000.

4. The process of claim 1 wherein said quantity is greater than 2 m$^3$ of said gas per kg of oligocarbonate melt.

5. The process of claim 1 wherein inert gas is selected from the group consisting of the noble gases, nitrogen and $CO_2$.

6. The process of claim 1 wherein said process is carried out at temperatures of 250° C. to 350° C.

* * * * *